United States Patent
Higaki et al.

(10) Patent No.: US 8,742,015 B2
(45) Date of Patent: Jun. 3, 2014

(54) THERMOPLASTIC RESIN COMPOSITION AND MOLDED ARTICLE

(75) Inventors: Keigo Higaki, Chuo-ku (JP); Yasuhiko Itou, Chuo-ku (JP)

(73) Assignee: Techno Polymer Co., Ltd., Tokyo (JP)

(*) Notice: Subject to any disclaimer, the term of this patent is extended or adjusted under 35 U.S.C. 154(b) by 215 days.

(21) Appl. No.: 12/376,127

(22) PCT Filed: Jul. 11, 2007

(86) PCT No.: PCT/JP2007/063854
§ 371 (c)(1),
(2), (4) Date: Feb. 3, 2009

(87) PCT Pub. No.: WO2008/015892
PCT Pub. Date: Feb. 7, 2008

(65) Prior Publication Data
US 2010/0004394 A1    Jan. 7, 2010

(30) Foreign Application Priority Data

Aug. 3, 2006  (JP) .................................. 2006-212629

(51) Int. Cl.
*C08L 51/04* (2006.01)
(52) U.S. Cl.
USPC ................... 525/71; 525/83; 525/84; 525/87; 525/199
(58) Field of Classification Search
USPC .................................. 525/71, 83, 84, 87, 199
See application file for complete search history.

(56) References Cited

U.S. PATENT DOCUMENTS 4,985,497 A    1/1991   Kamins et al.

FOREIGN PATENT DOCUMENTS

| JP | 3 287653    | 12/1991 |
|----|-------------|---------|
| JP | 9 31278     | 2/1997  |
| JP | 9 31294     | 2/1997  |
| JP | 9 87484     | 3/1997  |
| JP | 9-151311    | 6/1997  |
| JP | 2000 26694  | 1/2000  |
| JP | 2003 327779 | 11/2003 |
| JP | 2005-290179 | 10/2005 |

OTHER PUBLICATIONS

Okamoto et al., machine tranlation of JP 2000-026694 (Jan. 2000).*
European Office Action issued on Jun. 24, 2011 in corresponding European Application No. 07 790 658.4.
Japanese Office Action dated Jan. 17, 2012, issued in the corresponding Japanese Application JP 2007-182568, filed Jul. 11, 2007 (without English-language Translation).
Office Action issued on Jun. 14, 2012 in the corresponding European Application No. 07 790 658.4.
Office Action issued Apr. 29, 2013 in European Application No. 07 790 658.4.
Japanese Office Action dated Oct. 16, 2012, issued in the corresponding Japanese Application JP 2007-182568, filed Jul. 11, 2007 (without English-language Translation).

* cited by examiner

*Primary Examiner* — Jeffrey Mullis
(74) *Attorney, Agent, or Firm* — Obon, Spivak, McClelland, Maier & Neustadt, L.L.P.

(57) ABSTRACT

The objective of the present invention is to provide a thermoplastic resin composition having an excellent balance of chemical resistance, heat resistance and impact resistance and a molded article comprising this thermoplastic resin composition. The present thermoplastic resin composition comprises a rubber-reinforced resin, an ethylene•(meth)acrylic acid ester•carbon monoxide copolymer, and polytetrafluoroethylene, and contents of ethylene•(meth)acrylic acid ester•carbon monoxide copolymer and polytetrafluoroethylene are respectively from 0.5 to 20 parts by weight and from 0.01 to 5 parts by weight, with respect to 100 parts by weight of the rubber-reinforced resin. A modified polyolefin resin may be contained.

16 Claims, No Drawings

THERMOPLASTIC RESIN COMPOSITION AND MOLDED ARTICLE

FIELD OF THE INVENTION

The present invention relates to a thermoplastic resin composition having an excellent balance of chemical resistance, heat resistance and impact resistance and to a molded article comprising this thermoplastic resin composition.

PRIOR ART

Conventionally, an ABS-based resin has been widely used as a raw material for molded articles for a vehicle interior in an automobile or the like. The ABS-based resin is non-crystalline and is excellent in heat resistance, rigidity, dimensional accuracy and the like, but entails problems in that the resin deteriorates and mechanical strength decreases after long use. For example, the temperature in a vehicle rises in seasons having high air temperatures, thereby the molded article sometimes deforms and heat resistance is not sufficient. Additionally, when a finger or another part of the body comes into contact with the molded article, skin oils or creams seep into the molded article, and deterioration of mechanical strength, color changes and the like may occur and chemical resistance is not sufficient.

A variety of resin compositions employing ABS-based resins and having improved chemical resistance have been disclosed. Patent Document 1 discloses a thermoplastic resin composition which contains a rubber-reinforced styrene-based resin and a ternary copolymer of ethylene, (meth)acrylate ester and carbon monoxide. In addition, Patent Document 2 discloses a thermoplastic resin composition which contains a rubber-reinforced vinyl-based resin and two or more copolymers of ethylene, (meth)acrylic acid ester and carbon monoxide having different MFR values.

[Patent Document 1] JP-A H09-87484
[Patent Document 2] JP-A 2003-327779

DISCLOSURE OF THE INVENTION

Problems that the Invention is to Solve

The compositions taught in the above-mentioned Patent Document 1 and Patent Document 2 can all provide molded articles excellent in chemical resistance. However, when the compositions are used as a material for forming molded articles for a vehicle interior, chemical resistance and heat resistance remain inadequate, and further improvements are required. Additionally, when a molded article having a weld portion is manufactured by injection molding with multiple gates, the strength of the weld portion sometimes deteriorates.

The objective of the present invention is to provide a thermoplastic resin composition having an excellent balance of chemical resistance, heat resistance and impact resistance and a molded article comprising this thermoplastic resin composition.

Means for Solving the Problems

The present inventors studied diligently to solve the problems above. As a result, that a composition comprising a rubber-reinforced resin including a rubber-reinforced copolymeric resin which is obtained by polymerization of a vinyl-based monomer in the presence of a rubbery polymer, an ethylene•(meth)acrylic acid ester•carbon monoxide copolymer and polytetrafluoroethylene, a composition comprising the above-mentioned components and a modified polyolefin resin had an excellent balance of chemical resistance, heat resistance and impact resistance and led to a molded article in which weld portion is hard to break was found to complete the present invention.

The present invention is as follows.

1. A thermoplastic resin composition characterized by comprising a rubber-reinforced resin, an ethylene•(meth)acrylic acid ester•carbon monoxide copolymer, and polytetrafluoroethylene, wherein the content of the ethylene•(meth)acrylic acid ester•carbon monoxide copolymer and the content of the polytetrafluoroethylene are respectively in the range from 0.5 to 20 parts by weight and in the range from 0.01 to 5 parts by weight, with respect to 100 parts by weight of the rubber-reinforced resin.

2. The thermoplastic resin composition according to 1 above, wherein the rubber-reinforced resin comprises a unit derived from α-methyl styrene and/or a unit derived from a maleimide-based compound.

3. The thermoplastic resin composition according to 1 or 2 above, wherein the rubber-reinforced resin is a resin consisting of a rubber-reinforced copolymeric resin (A1) which is obtained by polymerizing a vinyl-based monomer (b1) in the presence of a rubbery polymer (a), or of a mixture of the rubber-reinforced copolymeric resin (A1) and a copolymer (A2) which is obtained by polymerizing a vinyl-based monomer (b2), wherein the content of the rubbery polymer (a) is in the range from 5% to 40% by weight with respect to 100% by weight of the rubber-reinforced resin, and wherein the total amount of a unit derived from α-methyl styrene and a unit derived from a maleimide-based compound is in the range from 3% to 60% by weight with respect to 100% by weight of the rubber-reinforced resin.

4. The thermoplastic resin composition according to 3 above, wherein a volume-average particle diameter of the rubbery polymer (a) is in the range from 30 to 2,000 nm.

5. The thermoplastic resin composition according to 3 or 4 above, wherein the rubbery polymer (a) is a diene-based rubbery polymer and a volume-average particle diameter of the diene-based rubbery polymer is in the range from 100 to 800 nm.

6. The thermoplastic resin composition according to 3 or 4 above, wherein the rubbery polymer (a) is a non-diene-based rubbery polymer and a volume-average particle diameter of the non-diene-based rubbery polymer is in the range from 50 to 150 nm.

7. The thermoplastic resin composition according to 3 above, wherein the rubbery polymer (a) is consisting of a rubbery polymer (a1) having a volume-average particle diameter in the range from 100 to 800 nm and a rubbery polymer (a2) having a volume-average particle diameter is in the range from 50 to 150 nm, and wherein the contents of the rubbery polymer (a1) and the rubbery polymer (a2) are respectively in the range from 10% to 70% by weight and in the range from 30% to 90% by weight with respect to 100% by weight of the total of both polymers.

8. The thermoplastic resin composition according to 7 above, wherein the rubbery polymer (a1) is a diene-based rubbery polymer and the rubbery polymer (a2) is a non-diene-based rubbery polymer.

9. The thermoplastic resin composition according to any one of 1 to 8 above, wherein the thermoplastic resin composition further comprises a modified polyolefin resin, and wherein the content of the modified polyolefin resin is in the range from 0.05 to 15 parts by weight with respect to 100 parts by weight of the rubber-reinforced resin.
10. The thermoplastic resin composition according to 9 above, wherein the modified polyolefin resin comprises an olefin-based resin having a functional group selected from the group consisting of carboxyl group, acid anhydride group, epoxy group, hydroxyl group and cyano group.
11. The thermoplastic resin composition according to 9 or 10 above, wherein the modified polyolefin resin is a graft copolymer obtained by polymerizing monomers consisting of an aromatic vinyl compound and a cyanidated vinyl compound in the presence of an olefin-based resin having epoxy group.
12. The thermoplastic resin composition according to any one of 1 to 11 above, wherein when a coating of dioctyl phthalate is applied under a stress to a degree of 2% bending strain, the time until cracking occurs is 60 minutes or more.
13. A molded article comprising the thermoplastic resin composition according to any one of 1 to 12 above.
14. The molded article according to 13 above, which is used for a vehicle component.

EFFECT OF THE INVENTION

According to the thermoplastic resin composition of the present invention, a balance of chemical resistance, heat resistance and impact resistance is excellent and a molded article in which weld portion is hard to break can be obtained by injection molding with multiple gates.

In the case where the above-mentioned rubber-reinforced resin contains a unit derived from α-methyl styrene and/or a unit derived from a maleimide-based compound, the thermoplastic resin composition of the present invention is excellent in chemical resistance and heat resistance in particular.

In the case where the above-mentioned rubber-reinforced resin contains further a modified polyolefin resin, miscibility among the rubber-reinforced resin, the ethylene•(meth) acrylic acid ester•carbon monoxide copolymer and the polytetrafluoroethylene is improved and a molded article in which weld portion formed by an injection molding with multiple gates is hard to break can be easily formed.

The molded article of the present invention comprising the thermoplastic resin composition has an excellent balance among chemical resistance, heat resistance and impact resistance, and a weld portion formed by an injection molding with multiple gates, and the like has a sufficient mechanical strength. Therefore, the molded article of the present invention is suitable for a vehicle component, in particular a component for a vehicle interior.

DESCRIPTION OF THE PREFERRED EMBODIMENTS

In the following, the present invention will be described in greater detail.

It is noted that "(co)polymer" means homopolymer and copolymer, and "(meth)acryl" means acryl and methacryl in the present invention.

1. Thermoplastic Resin Composition

The thermoplastic resin composition of the present invention is characterized in that it contains a rubber-reinforced resin (hereinafter, referred to as "component [A]"), an ethylene•(meth)acrylic acid ester•carbon monoxide copolymer (hereinafter, referred to as "component [B]"), and polytetrafluoroethylene (hereinafter, referred to as "component [C]"), and that the content of the ethylene•(meth)acrylic acid ester•carbon monoxide copolymer and the content of the polytetrafluoroethylene are respectively in the range from 0.5 to 20 parts by weight and in the range from 0.01 to 5 parts by weight, with respect to 100 parts by weight of the rubber-reinforced resin.

1-1. Rubber-reinforced Resin

The component [A] is consisting of a rubber-reinforced copolymeric resin (A1) obtained by polymerization of a vinyl-based monomer (b1) in the presence of a rubbery polymer (a), or of a mixture of this rubber-reinforced copolymeric resin (A1) and a (co)polymer (A2) of a vinyl-based monomer (b2).

The above-mentioned rubbery polymer (a) may be a homopolymer or a copolymer so long as it is rubbery at room temperature. In addition, this rubbery polymer (a) may be a non-crosslinked polymer or a crosslinked polymer. Specific examples include a diene-based polymer (a diene-based rubbery polymer) and a non-diene-based polymer (a non-diene-based rubbery polymer). These may be used singly or in combination.

Examples of the above-mentioned diene-based polymer (hereinafter, referred to as "diene-based rubbery polymer (a1)") include a homopolymer such as polybutadiene, polyisoprene and polychloroprene; a styrene•butadiene-based copolymeric rubber such as styrene•butadiene copolymer, styrene•butadiene•styrene copolymer and acrylonitrile•styrene •butadiene copolymer; a styrene•isoprene-based copolymeric rubber such as styrene•isoprene copolymer, styrene•isoprene•styrene copolymer and acrylonitrile•styrene•isoprene copolymer; natural rubber and the like. The above-mentioned copolymer may be a block copolymer or a random copolymer. The above-mentioned diene-based polymer may be used singly or in combination of two or more types thereof.

Additionally, examples of the above-mentioned non-diene-based polymer (hereinafter, referred to as "non-diene-based rubbery polymer (a2)") include an ethylene•α-olefin-based copolymeric rubber comprising an ethylene unit and a unit derived from an α-olefin having three or more carbon atoms; an acryl-based rubber; an urethane-based rubber; a silicone-based rubber such as a silicone rubber and a silicone-acryl-based IPN rubber; a polymer in which a (co)polymer comprising a unit derived from a conjugated diene-based compound is hydrogenated, and the like. Each of the above-mentioned copolymer may be a block copolymer or a random copolymer. The above-mentioned non-diene-based polymer may be used singly or in combination of two or more types thereof. In addition, the above-mentioned non-diene-based polymer is preferably an ethylene•α-olefin-based copolymeric rubber and an acryl-based rubber.

The above-mentioned ethylene•α-olefin-based copolymeric rubber is one which comprises an ethylene unit and a unit derived from an α-olefin having three or more carbon atoms, and examples thereof include an ethylene•α-olefin copolymeric rubber, an ethylene•α-olefin•non-conjugated diene copolymeric rubber and the like.

Examples of the α-olefin having three or more carbon atoms include propylene, butene-1, pentene-1,3-methyl-butene-1, hexene-1,3-methyl-pentene-1,4-methyl-pentene-1, 3,3-dimethyl-butene-1, heptene-1, methylhexene-1, dimethylpentene-1, trimethylbutene-1, ethylpentene-1, octene-1, propylpentene-1 and the like.

Additionally, examples of the non-conjugated diene include an acyclic compound such as 1,4-pentadiene, 1,4-hexadiene, 1,5-hexadiene and 1,6-hexadiene; a chain branched acyclic compound such as 5-methyl-1,4-hexadiene, 3,7-dimethyl-1,6-octadiene, 5,7-dimethylocta-1,6-diene, 3,7-dimethyl-1,7-octadiene, 7-methylocta-1,6-diene and dihydro myrcene; an alicyclic diene-based compound such as 5-methylene-2-norbornen, 5-ethylidene-2-norbornene, 5-propenyl-2-norbornene, 5-isopropylidene-2-norbornene, 5-cyclohexylidene-2-norbornene, 5-vinyl-2-norbornene, dicyclopentadiene, 1,4-cyclohexadiene, 1,4-cyclooctadiene, 1,5-cyclooctadiene, tetrahydroindene, methyltetrahydroindene, dicyclopentadiene and bicyclo[2.2.1]-hepta-2,5-diene; and the like.

Example of the above-mentioned ethylene•α-olefin copolymeric rubber include ethylene•propylene copolymer, ethylene•1-butene copolymer, ethylene•1-pentene copolymer, ethylene•3-methyl-1-butene copolymer, ethylene•1-hexene copolymer, ethylene•3-methyl-1-pentene copolymer, ethylene•4-methyl-1-pentene copolymer, ethylene•3-ethyl-1-pentene copolymer, ethylene•1-octene copolymer, ethylene•1-decene copolymer, ethylene•1-undecene copolymer and the like.

In addition, example of the ethylene•α-olefin•non-conjugated diene copolymeric rubber include ethylene•propylene•5-ethylidene-2-norbornene copolymer, ethylene•propylene-dicyclopentadiene copolymer, ethylene•propylene•5-ethylidene-2-norbornene•dicyclopentadiene copolymer, ethylene•propylene•5-ethylidene-2-norbornene•5-vinyl-2-norbornene copolymer, ethylene•1-butene 5-ethylidene-2-norbornene copolymer and the like.

The content of the ethylene unit constituting the above-mentioned ethylene•α-olefin-based copolymeric rubber is preferably in the range from 10% to 90% by weight, more preferably from 20% to 80% and further preferably from 30% to 70% with respect to the total amount of all units. Additionally, the number-average molecular weight (Mn) of the above-mentioned ethylene•α-olefin-based copolymeric rubber is preferably in the range from 5,000 to 1,000,000 and more preferably from 30,000 to 300,000. If this Mn is too large, workability in the case of using the resulting non-diene-based rubber-reinforced resin may be deteriorated. The ratio (Mw/Mn) between the weight-average molecular weight (Mw) and the number-average molecular weight is preferably 10 or less.

The above-mentioned acryl-based rubber (acryl-based rubbery polymer) is not particularly limited so long as it is a (co)polymer by a monomer comprising an acrylic acid alkyl ester and/or a methacrylic acid alkyl ester.

The above-mentioned monomer contains preferably an acrylic acid alkyl ester and particularly an acrylic acid alkyl ester having an alkyl group whose number of carbon atom is in the range from 1 to 12.

Examples of this acrylic acid alkyl ester include methyl acrylate, ethyl acrylate, n-propyl acrylate, isopropyl acrylate, n-butyl acrylate, isobutyl acrylate, tert-butyl acrylate, amyl acrylate, n-hexyl acrylate, n-octyl acrylate, 2-ethylhexyl acrylate, dodecyl acrylate, cyclohexyl acrylate, phenyl acrylate, benzyl acrylate and the like. Among these, n-butyl acrylate and 2-ethylhexyl acrylate are preferable. In addition, these acrylic acid alkyl esters may be used singly or in combination or two or more types thereof.

The above-mentioned acryl-based rubbery polymer may be a homopolymer obtained using one type among the above-mentioned acrylic acid alkyl ester, or a copolymer obtained using two or more types thereof. Additionally, it may be a copolymer obtained using one or more acrylic acid alkyl esters and one or more compounds which is capable of polymerizing with this acrylic acid alkyl ester.

The compound capable of copolymerizing with the above-mentioned acrylic acid alkyl ester is not particularly limited and includes a methacrylic acid alkyl ester, a monofunctional aromatic vinyl compound, a monofunctional cyanidated vinyl compound, a diene compound, multifunctional vinyl compound and the like. These may be used singly or in combination of two or more thereof.

The shape of the rubbery polymer (a) used for forming the above-mentioned rubber-reinforced copolymeric resin (A1) is not particularly limited, however, the volume-average particle diameter is preferably in the range from 30 to 2,000 nm, more preferably from 100 to 1,500 nm, and further preferably from 200 to 1,000 nm in the case of granular. If the volume-average particle diameter is too small, impact resistances of the composition of the present invention and of the molded article comprising this composition tend to be inferior. On the other hand, if the volume-average particle diameter is too large, the outer appearance of the molded article tends not to be favorable. The volume-average particle diameter can be measured by laser diffraction, light scattering, or the like.

In the case where the above-mentioned rubbery polymer (a) is granular due to emulsion polymerization, one enlarged by a known method such as methods described in JP-A S61-233010, JP-A S59-93701, JP-A S56-167704 and the like may be used so long as the volume-average particle diameter is in the above range.

Preferable embodiments of the rubbery polymer (a) constituting the rubber-reinforced resin in the present invention are as follows.

[i] An embodiment where the rubbery polymer (a) is an only one type of rubbery polymer and the volume-average particle diameter of the rubbery polymer is in the range from 30 to 2,000 nm. This rubbery polymer (a) may be a diene-based rubbery polymer (a1) or a non-diene-based rubbery polymer (a2).

[ii] An embodiment where the rubbery polymer (a) is a diene-based rubbery polymer (a1) and the volume-average particle diameter of the diene-based rubbery polymer (a1) is in the range from 100 to 800 nm.

[iii] An embodiment where the rubbery polymer (a) is a non-diene-based rubbery polymer (a2) and the volume-average particle diameter of the non-diene-based rubbery polymer (a2) is in the range from 50 to 150 nm. This non-diene-based rubbery polymer (a2) is preferably an acryl-based rubbery polymer.

[iv] An embodiment where the rubbery polymer (a) is consisting of a rubbery polymer (a') having a volume-average particle diameter of 100 to 800 nm, preferably 150 to 600 nm and a rubbery polymer (a") having a volume-average particle diameter of 70 to 120 nm, preferably 80 to 110 nm, and a content ratio of the rubbery polymer (a') and the rubbery polymer (a") is preferably 10% to 70% by weight and 30% to 90% by weight, more preferably 20% to 60% by weight and 40% to 80% by weight, and further preferably 25% to 55% by weight and 45% to 75% by weight, respectively, based on 100% by weight of the total of these polymers. The rubbery polymer (a') is preferably a arene-based rubbery polymer (a1). In addition, the rubbery polymer (a") is preferably a non-diene-based rubbery polymer (a2) and particularly an acryl-based rubbery polymer.

In consideration of controlling the average particle diameter and other factors, the method for manufacturing the above-mentioned rubbery polymer (a) such as a diene-based rubber, an acryl-based rubber and a silicone-based rubber is preferably emulsion polymerization. The average particle diameter in such instances can be controlled by the selection of conditions including type and amount of an emulsifier, type and amount of a polymerization initiator, polymerization time, polymerization temperature, stirring conditions and the like. In addition, a method in which two or more types of rubbery polymer (a) having different particle diameters are blended may also be used as another method for controlling the volume-average particle diameter (particle-diameter distribution).

Examples of the above-mentioned vinyl-based monomer (b1) used in forming the above-mentioned rubber-reinforced copolymeric resin (A1) include an aromatic vinyl compound, a cyanidated vinyl compound, a (meth)acrylic acid ester compound, a maleimide-based compound, an acid anhydride and the like. These may be used singly or in combination.

The above-mentioned aromatic vinyl compound is not particularly limited so long as it is a compound having at least one vinyl bond and at least one aromatic ring. The example includes styrene, α-methyl styrene, o-methyl styrene, p-methyl styrene, vinyl toluene, β-methyl styrene, ethyl styrene, p-tert-butyl styrene, vinyl xylene, vinyl naphthalene, monochlorostyrene, dichlorostyrene, monobromostyrene, dibromostyrene, fluorostyrene and the like. These may be used singly or in combination of two or more types thereof. In addition, styrene and α-methyl styrene are preferred among these.

Examples of the above-mentioned cyanidated vinyl compound include acrylonitrile, methacrylonitrile and the like. These may be used singly or in combination of two or more types thereof. In addition, acrylonitrile is preferred among these.

Examples of the above-mentioned (meth)acrylic acid ester compound include methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth) acrylate, hexyl (meth)acrylate, cyclohexyl (meth)acrylate, phenyl (meth)acrylate and the like. These may be used singly or in combination of two or more types thereof. In addition, methyl methacrylate is preferred among these.

Examples of the above-mentioned maleimide-based compound include maleimide, N-methylmaleimide, N-butylmaleimide, N-phenylmaleimide, N-(2-methylphenyl)maleimide, N-(4-hydroxyphenyl)maleimide, N-cyclohexylmaleimide and the like. These may be used singly or in combination of two or more types thereof. In addition, N-phenylmaleimide is preferred among these. Another method for introducing a monomer unit of a maleimide compound into a polymer includes an imidization after copolymerization with maleic anhydride.

Examples of the above-mentioned acid anhydride include maleic anhydride, itaconic anhydride, citraconic anhydride and the like. These may be used singly or in combination of two or more types thereof.

Further, a vinyl-based compound having a functional group such as hydroxyl group, amino group, epoxy group, amide group, carboxyl group and oxazoline group may be used in addition to the above-mentioned compounds, if necessary. For example, 2-hydroxyethyl (meth)acrylate, hydroxystyrene, N,N,-dimethylaminomethyl (meth)acrylate, N,N-diethyl-p-aminomethylstyrene, glycidyl (meth)acrylate, 3,4-oxycyclohexyl (meth)acrylate, vinylglycidylether, methallyl glycidylether, allyl glycidylether, methacrylamide, acrylamide, (meth)acrylic acid, vinyl oxazoline and the like may be used. These may be used singly or in combination of two or more types thereof.

The vinyl-based monomer (b1) used for the formation of the above-mentioned rubber-reinforced copolymeric resin (A1) is preferably primarily a combination of compounds described below.

(1) An aromatic vinyl compound and a cyanidated vinyl compound.
(2) An aromatic vinyl compound, a cyanidated vinyl compound, and a maleimide-based compound.

In the embodiment (1) above, amounts of the aromatic vinyl compound and the cyanidated vinyl compound to be used are preferably 50% to 97% by weight and 3% to 50% by weight and more preferably 55% to 95% by weight and 5% to 45% by weight, respectively, based on 100% by weight of the total of these compounds.

Additionally, in the embodiment (2) above, amounts of the aromatic vinyl compound, the cyanidated vinyl compound and maleimide-based compound to be used are preferably 50% to 96% by weight, 3% to 49% by weight and 1% to 50% by weight, and more preferably 50% to 90% by weight, 5% to 45% by weight and 5% to 45% by weight, respectively, based on 100% by weight of the total of these compounds.

When α-methyl styrene is used as the above-mentioned aromatic vinyl compound in the embodiments (1) and (2) above, content of α-methyl styrene in the above-mentioned aromatic vinyl compound is preferably in the range from 10% to 100% by weight and more preferably from 20% to 90% by weight.

It is noted that the embodiments (1) and (2) above comprise other monomers. And the monomers may be used singly or in combination.

As mentioned above, preferable embodiments of the rubbery polymer (a) constituting the rubber-reinforced resin are [i] to [iv] above. Accordingly, the rubber-reinforced copolymeric resin (A1) using the rubbery polymer (a) and the vinyl-based monomer (b1) is preferably a resin where the above embodiment [i], [ii], [iii] or [iv] and the above embodiment (1) or (2) are in combination.

The above-mentioned rubber-reinforced copolymeric (A1) may be used singly or in combination of two or more.

As described above, the above-mentioned component [A] may be solely a rubber-reinforced copolymeric resin (A1), or a mixture of the rubber-reinforced copolymeric resin (A1) and a (co)polymer (A2) which is obtained by polymerizing a vinyl-based monomer (b2). This vinyl-based monomer (b2) may be used one or more compounds selected from the vinyl-based monomer (b1) used for forming the rubber-reinforced copolymeric resin (A1). The above-mentioned (co)polymer (A2) may therefore be a polymer which is obtained by polymerizing the vinyl-based monomer (b2) that is exactly the same composition as the vinyl-based monomers (b1) used for forming the rubber-reinforced copolymeric resin (A1), a polymer which is obtained by polymerizing the same types of monomers in a different combination, or a polymer which is obtained by polymerizing different types of monomers in a different combination. Two or more different types of these polymers may be included.

The above-mentioned (co)polymer (A2) is a homopolymer or a copolymer obtained by polymerizing the vinyl-based monomer (b2), and preferable embodiments are exemplified in the following (3) to (9).

(3) One or more types of (co)polymers obtained by polymerizing solely an aromatic vinyl compound.
(4) One or more types of (co)polymers obtained by polymerizing solely a (meth)acrylic acid alkyl ester compound.
(5) One or more types of (co)polymers obtained by polymerizing an aromatic vinyl compound and a cyanidated vinyl compound.
(6) One or more types of (co)polymers obtained by polymerizing an aromatic vinyl compound and a (meth)acrylic acid alkyl ester compound.

(7) One or more types of (co)polymers obtained by polymerizing an aromatic vinyl compound, a cyanidated vinyl compound and a (meth)acrylic acid alkyl ester compound.
(8) One or more types of (co)polymers obtained by polymerizing an aromatic vinyl compound and a maleimide-based compound.
(9) One or more types of (co)polymers obtained by polymerizing an aromatic vinyl compound, a cyanidated vinyl compound and a maleimide-based compound.

These may be used singly or in combination of two or more types thereof.

In the case of using α-methyl styrene as the above-mentioned aromatic vinyl compound in the above-mentioned embodiments (3) to (9), the content of α-methyl styrene in the above-mentioned aromatic vinyl compound is preferably in the range from 10% to 100% by weight and more preferably from 20% to 90% by weight.

It is noted that monomers may be compounds used for forming the above-mentioned rubber-reinforced copolymeric resin (A1) and the preferable ones are the same. Additionally, in the case where the above-mentioned (co)polymer (A2) is a copolymer, ratio of monomers to be used is not particularly limited.

Therefore, specific examples of the above-mentioned (co)polymer (A2) include acrylonitrile•styrene copolymer, acrylonitrile•α-methyl styrene copolymer, acrylonitrile•styrene•α-methylstyrene copolymer, acrylonitrile•styrene•methyl methacrylate copolymer, styrene•methyl methacrylate copolymer, styrene•N-phenylmaleimide copolymer, acrylonitrile•styrene•N-phenylmaleimide copolymer and the like.

For the purpose of obtaining remarkably excellent chemical resistance and heat resistance in the present invention, the above-mentioned component [A] comprises preferably a unit derived from α-methyl styrene and/or a unit derived from a maleimide-based compound in the case where the component [A] is consisting of the rubber-reinforced copolymeric resin (A1) or of this rubber-reinforced copolymeric resin (A1) and the (co)polymer (A2). The lower limit for the total of these units is preferably 3% by weight, more preferably not less than 3% by weight, further preferably not less than 5% by weight, and particularly preferably not less than 10% with respect to 100% by weight of the above-mentioned rubber-reinforced resin. In addition, the upper limit is preferably 70% by weight, more preferably less than 70% by weight, further preferably less than 65% by weight, and particularly preferably less than 60% by weight. When the content is in the above range, hardness of the surface is high and scratch resistance is excellent. Therefore reductions in mechanical strength due to seepage of chemicals, cosmetics and the like may be suppressed and a high degree of chemical resistance may be exhibited.

Accordingly, the above-mentioned vinyl-based monomer (b1) preferably includes at least one of α-methyl styrene and a maleimide-based compound in the case where the above-mentioned component [A] is composed solely of the rubber-reinforced copolymeric resin (A1).

Further, in the case where the above-mentioned component [A] is composed of the rubber-reinforced copolymeric resin (A1) and the (co)polymer (A2), at least one of the above-mentioned vinyl-based monomer (b1) and (b2) preferably includes at least one of α-methyl styrene and a maleimide-based compound.

The graft ratio of the above-mentioned rubber-reinforced copolymeric resin (A1) is preferably in the range from 10% to 200% by weight, more preferably from 15% to 150% by weight, and further preferably from 20% to 150% by weight.

If the graft ratio of the above-mentioned rubber-reinforced copolymeric resin (A1) is less than 10% by weight, outer appearance and impact resistance of the present composition and a molded article comprising the composition may be deteriorated. Additionally, if it is more than 200% by weight, moldability may be inferior.

Here, the graft ratio refers to a value obtained by the following equation:

$$\text{Graft ratio (\% by weight)} = \{(y-x)/x\}100,$$

where x (g) is the amount of the rubber component in 1 g of the above-mentioned rubber-reinforced copolymeric resin (A1), and y (g) is the amount of the insoluble component when 1 g of the above-mentioned rubber-reinforced copolymeric resin (A1) is dissolved in acetone (acetonitrile is used in the case where an acryl-based rubber is used as the rubbery polymer (a)).

Moreover, an intrinsic viscosity $[\eta]$ (measured in methylethylketone at a temperature of 30° C.) of a component dissolved by acetone (acetonitrile is used in the case where an acryl-based rubber is used as the rubbery polymer (a)) in the above-mentioned rubber-reinforced copolymeric resin (A1) is preferably in the range from 0.1 to 1.0 dl/g, further preferably from 0.2 to 0.9 dl/g, and particularly from 0.3 to 0.7 dl/g. This range leads to a composition excellent in moldability and impact resistance and a molded article comprising the composition in the present invention.

The above-mentioned graft ratio and intrinsic viscosity $[\eta]$ can easily be controlled by varying types or amounts of the polymerization initiator, the chain-transfer agent, the emulsifier, the solvent and the like, and by varying polymerization time, polymerization temperature and other conditions in producing the rubber-reinforced copolymeric resin (A1).

In the case where the above-mentioned rubber-reinforced copolymeric resin (A1) contains the rubbery polymers (a') and (a") as described above, the rubber-reinforced resin is preferably a resin containing a rubber-reinforced copolymeric resin (A1') obtained by polymerizing a vinyl-based monomer (b1) in the presence of a rubbery polymer (a'), preferably a diene-based rubbery polymer (a1), and a rubber-reinforced copolymeric resin (A1") obtained by polymerizing a vinyl based monomere (b1) in the presence of a rubbery polymer (a"), preferably a non-diene-based rubbery polymer (a2).

A graft ratio of the above-mentioned rubber-reinforced copolymeric resin (A1') is preferably in the range from 10% to 200% by weight, more preferably from 20% to 150% by weight and particularly from 30% to 100% by weight. In addition, an intrinsic viscosity of a component dissolved by acetone is preferably in the range from 0.1 to 1.0 dl/g, more preferably from 0.2 to 0.9 dl/g, and particularly from 0.3 to 0.8 dl/g.

On the other hand, a graft ratio of the above-mentioned rubber-reinforced copolymeric resin (A1") is preferably in the range from 20% to 150% by weight, more preferably from 30% to 120% by weight and particularly from 40% to 100% by weight. In addition, an intrinsic viscosity of a component dissolved by acetone is preferably in the range from 0.1 to 1.0 dl/g, more preferably from 0.2 to 0.9 dl/g, and particularly from 0.3 to 0.8 dl/g.

The above-mentioned rubber-reinforced copolymeric resin (A1) may be a resin which is obtained by polymerizing a vinyl-based monomer (b1) in the presence of rubbery polymers (a') and (a").

Next, production methods of the rubber-reinforced copolymeric resin (A1) and the (co)polymer (A2) will be described.

The above-mentioned rubber-reinforced copolymeric resin (A1) can be produced by preferably emulsion polymerization, solution polymerization or bulk polymerization of a vinyl-based monomer (b1) in the presence of a rubbery polymer (a).

The production of the rubber-reinforced copolymeric resin (A1) using the rubbery polymer (a) and the vinyl-based monomer (b1) may be conducted by charging all of the vinyl-based monomer (b1) at once in the presence of the whole amount of the rubbery polymer (a), or by charging it dividedly or successively. Alternatively, these methods may be combined. Further, the production may be conducted by adding the whole amount or a part of the rubbery polymer (a) in the middle of the polymerization.

In the case where the rubber-reinforced copolymeric resin (A1) is produced in an amount of 100 parts by weight, an amount of the rubbery polymer (a) to be used is preferably in the range from 5 to 80 parts by weight, more preferably from 10 to 70 parts by weight and further preferably from 15 to 60 parts by weight. Additionally, an amount of the vinyl-based monomer (b1) to be used is preferably in the range from 20 to 95 parts by weight, more preferably from 30 to 90 parts by weight and further preferably from 40 to 85 parts by weight.

In the case of producing the rubber-reinforced copolymeric resin (A1) by emulsion polymerization, a polymerization initiator, a chain-transfer agent (a molecular weight adjusting agent), an emulsifier, water and the like are used.

Examples of the above-mentioned polymerization initiator include a redox-type initiator by combining an organic peroxide such as cumene hydroperoxide, diisopropylbenzene hydroperoxide and p menthane hydroperoxide, and a reducing agent such as sugar-containing pyrophosphoric acid formulation and sulfoxylate formulation; a persulfate such as potassium persulfate; a peroxide such as benzoyl peroxide (BPO), lauroyl peroxide, tert-butylperoxy laurate and tert-butylperoxy monocarbonate; and the like. These may be used singly or in combination of two or more types thereof. Further, the above-mentioned polymerization initiator is added into the reaction system all at once or continuously. In addition, the above-mentioned polymerization initiator is used usually in an amount from 0.1% to 1.5% by weight and preferably from 0.2% to 0.7% by weight with respect to the total amount of the above-mentioned vinyl-based monomer (b1).

Examples of the above-mentioned chain-transfer agent include a mercaptan such as octyl mercaptan, n-dodecyl mercaptan, tert-dodecyl mercaptan, n-hexyl mercaptan, n-hexadecyl mercaptan, n-tetradecyl mercaptan and tert-tetradecyl mercaptan; a terpinolene, α-methyl styrene dimer, and the like. These may be used singly or in combination of two or more types thereof. The above-mentioned chain-transfer agent is used usually in an amount from 0.05% to 2.0% by weight with respect to the total amount of the above-mentioned vinyl-based monomer (b1).

Examples of the above-mentioned emulsifier in the case of emulsion polymerization include an anionic surfactant such as a sulfuric acid ester of a higher alcohol, an alkyl benzene sulfonate including sodium dodecylbenzene sulfonate, an aliphatic sulfonate including sodium lauryl sulfonate, a higher aliphatic carboxylate, and a phosphate-based compound; a nonionic surfactant such as alkyl ester or alkyl ether of polyethylene glycol; and the like. These may be used singly or in combination of two or more types thereof. The emulsifier is used usually in an amount from 0.3% to 5.0% by weight with respect to the total amount of the above-mentioned vinyl-based monomer (b1).

A latex obtained by emulsion polymerization is usually subjected to solidification by a coagulant, the polymer component is pulverized, and then the product is purified by rinsing and drying. The coagulant may be used an inorganic salt such as calcium chloride, magnesium sulfate, magnesium chloride and sodium chloride; an inorganic acid such as sulfuric acid and hydrochloric acid; an organic acid such as acetic acid and lactic acid; and the like.

In the case of a combination of plural rubber-reinforced copolymeric resins (A1), blending may be conducted after the production of the resins. Other method is one where latexes containing resins respectively are produced, blending is conducted, and then coagulation is conducted to a mixed rubber-reinforced copolymeric resin (A1).

The production method for the rubber-reinforced copolymeric resin (A1) by solution polymerization and bulk polymerization may be applied to publicly known method.

The above-mentioned (co)polymer (A2) can be produced by polymerization such as solution polymerization, bulk polymerization, emulsion polymerization and suspension polymerization, of the vinyl-based monomer (b2) using a polymerization initiator applying in the production of the above-mentioned rubber-reinforced copolymeric resin (A1), or by thermal polymerization using no polymerization initiators. Alternatively, these polymerization methods may be combined.

An intrinsic viscosity [η] (measured in methylethylketone at a temperature of 30° C.) of the above-mentioned (co)polymer (A2) is preferably in the range from 0.1 to 1.0 dl/g and more preferably from 0.15 to 0.7 dl/g. When the intrinsic viscosity [η] is in the above-mentioned range, a physical property balance between moldability and impact resistance is excellent. The intrinsic viscosity [η] of the (co)polymer (A2) can be controlled by adjusting the production condition, similar to the case for the rubber-reinforced copolymeric resin (A1).

An intrinsic viscosity [η] (measured in methylethylketone at a temperature of 30° C.) of a component dissolved by acetone (acetonitrile in case of an acryl-based rubber as the rubbery polymer (a)) of the above-mentioned component [A] is preferably in the range from 0.1 to 0.8 dl/g and more preferably from 0.15 to 0.7 dl/g. When the intrinsic viscosity [η] is in the above-mentioned range, a physical property balance between moldability and impact resistance is excellent.

In the case where the above-mentioned component [A] is a rubber-reinforced copolymeric resin (A1) or a mixture of the rubber-reinforced copolymeric resin (A1) and a (co)polymer (A2), the lower limit for the content of the rubbery polymer (a) in the above-mentioned rubber-reinforced resin is preferably 5% by weight, more preferably not less than 5% by weight, further preferably not less than 10% by weight, and particularly not less than 12% by weight, and the upper limit is preferably 40% by weight, more preferably less than 40%, further preferably less than 30%, and particularly less than 22%. When the content of the rubbery polymer (a) is in this range, moldability is excellent, and impact resistance and heat resistance of a molded article comprising the present composition are also excellent. If the content of the rubbery polymer (a) is too much, moldability and heat resistance tend to be deteriorated.

1-2. Ethylene•(meth)acrylic acid ester•carbon monoxide copolymer

This component [B] is a copolymer comprising an ethylene unit (hereinafter, referred to as "unit (t1)"), a unit derived from a (meth)acrylic acid ester (hereinafter, referred to as "unit (t2)"), and a unit derived from carbon monoxide (hereinafter, referred to as "unit (t3)").

The content of the above-mentioned unit (t1) is preferably in the range from 10% to 87% by weight and more preferably from 40% to 80% by weight with respect to 100% by weight of the above-mentioned component [B]. The content of the above-mentioned unit (t2) is preferably in the range from 10% to 57% by weight and more preferably from 15% to 40% by weight with respect to 100% by weight of the above-mentioned component [B]. Further, the content of the above-mentioned unit (t3) is preferably in the range from 3% to 40% by weight and more preferably from 5% to 20% by weight with respect to 100% by weight of the above-mentioned component [B].

The (meth)acrylic acid ester that forms the above-mentioned unit (t2) is preferably a compound having 1 to 4 carbons. This compound may be used singly or in combination. Among these, methyl methacrylate and n-butyl acrylate are particularly preferable.

The MFR (in accordance with JIS K7210, temperature: 200° C., load: 19.6 N) of the above-mentioned component [B] is preferably in the range from 1 to 150 g/10 min., and more preferably from 3 to 130 g/10 min. Use of the component [B] in this range leads to an excellent chemical resistance and an undesirable phenomenon such as peeling in laminae can be suppressed.

The above-mentioned component [B] may be used singly or in combination of two or more.

The above-mentioned component [B] can be manufactured according to the method disclosed in JP-A H09-87484, for example. Specifically, ethylene, a (meth)acrylic acid ester, and carbon monoxide are used as monomers. The carbon monoxide and the (meth)acrylic acid ester are introduced into an ethylene supply system by use of a pressure of a reaction vessel at first. Subsequently, this monomer mixture is introduced into the reaction vessel wholly or separately by use of a pressure of the reaction vessel to produce. A radical polymerization catalyst (such as peroxide, perester, azo compound and percarbonate) may also be introduced into the reaction vessel via other supply line as necessary. The temperature in the reaction vessel is usually 140° C. or higher, preferably in the range from 155° C. to 300° C., and more preferably from 155° C. to 225° C. The pressure in the reaction vessel is usually in the range from $3.45 \times 10^3$ to $4.14 \times 10^8$ Pa, and preferably from $1.38 \times 10^8$ to $2.41 \times 10^8$ Pa.

The above-mentioned component [B] may be used a commercial product and examples thereof include "ELVALOY HP-4051" and "ELVALOY HP-443" manufactured by Du Pont-Mitsui Polychemicals Co., and the like.

The content of the above-mentioned component [B] in the thermoplastic resin composition of the present invention is in the range from 0.5 to 20 parts by weight with respect to 100 parts by weight of the component [A]. The lower limit for the content of the above-mentioned component [B] is preferably more than 0.5 part by weight, more preferably not less than 1 part by weight, and further preferably not less than 2 parts by weight. In addition, the upper limit is preferably less than 20 parts by weight, more preferably 15 parts by weight, and further preferably less than 15 parts by weight. If the content or the component [B] is too little, chemical resistance is not sufficient. On the other hand, if it is too much, defect such as peeling in laminae and orientational cracking sometimes occur and heat resistance may be reduced.

1-3. Polytetrafluoroethylene

The component [C] is a polymer comprising a unit derived from tetrafluoroethylene and may be a homopolymer or a copolymer. In the case of a copolymer, one in which tetrafluoroethylene and vinylidene fluoride, hexafluoropropylene and the like are subjected to polymerization (emulsion polymerization, suspension polymerization and the like) may be used. The above-mentioned component [C] is preferably a homopolymer of tetrafluoroethylene.

The weight-average molecular weight of the above-mentioned component [C] is usually 500,000 or more, and preferably 1,000,000 or more.

Regarding a method for using the above-mentioned component [C], polytetrafluoroethylene may be used singly, or a mixture of polytetrafluoroethylene and a lubricant such as magnesium stearate, a mixture in which polytetrafluoroethylene is clathrated by the (co)polymer (A2) such as acrylonitrile•styrene copolymer or a resin, and the like may be used.

The content of the above-mentioned component [C] in the thermoplastic resin composition of the present invention is in the range from 0.01 to 5 parts by weight with respect to 100 parts by weight of the component [A]. The lower limit for the content of the above-mentioned component [C] is preferably more than 0.01 part by weight, more preferably more than 0.05 part by weight, further preferably more than 0.1 parts by weight, and particularly more than 0.2 part by weight. In addition, the upper limit is preferably less than 5 parts by weight, more preferably 3 parts by weight, and further preferably less than 1 part by weight. If the content of the component [C] is too little, chemical resistance may be insufficient. On the other hand, if the content is too much, moldability may be deteriorated and peeling in laminae sometimes occurs.

The content ratio of the above-mentioned components [B] and [C] in the thermoplastic resin composition of the present invention is preferably 100:1 to 1:1, and more preferably 50:1 to 3:1. The above-mentioned ranges lead to a composition having an excellent balance of heat resistance, impact resistance and layered peeling resistance.

In the present invention, when the above-mentioned component [C] is used, an additional improvement in chemical resistance is achieved. As a result, the component [B], which lowers heat resistance, can be used in a correspondingly smaller amount; and an exceptionally heat resistant resin composition can be obtained.

The thermoplastic resin composition may be one comprising other thermoplastic resins depending on purpose or application.

In the present invention, it is preferable that an olefin-based resin having at least one functional group (polar group) selected from the group consisting of carboxyl group, acid anhydride group, epoxy group, hydroxyl group and cyano group (hereinafter, referred to as "modified polyolefin resin").

1-4. Modified Polyolefin Resin

This modified polyolefin resin is not particularly limited so long as it comprises a unit derived from an olefin such as ethylene and propylene in an amount of 60% or more by weight and has at least one functional group selected from the group consisting of carboxyl group, acid anhydride group, epoxy group, hydroxyl group and cyano group.

Specific examples of the above-mentioned modified polyolefin resin are as follows.

(1) Olefin-based resin having carboxyl group.
(2) Olefin-based resin having acid anhydride group.
(3) Olefin-based resin having epoxy group.
(4) Olefin-based resin having hydroxyl group.
(5) Olefin-based resin having cyano group.
(6) Graft copolymer obtained by polymerizing a polymerizable unsaturated monomer including an aromatic vinyl compound and a cyanidated vinyl compound in the presence of an olefin-based resin having epoxy group.

(7) Graft copolymer obtained by polymerizing a polymerizable unsaturated monomer including an aromatic vinyl compound and a cyanidated vinyl compound in the presence of an unmodified olefin-based resin.

The weight-average molecular weight of the above-mentioned modified polyolefin resin is not particularly limited, and it is usually in the range from 5,000 to 300,000.

An olefin-based resin to be modified (unmodified polyolefin resin) may be used a homopolymer of an olefin, and a copolymer of two or more olefins. Specific examples of the resin include polyethylene, polypropylene, polymethylpentene, ethylene•propylene block copolymer, ethylene•propylene random copolymer, ethylene•α-olefin copolymer, propylene•α-olefin copolymer, and the like.

Examples of the modified polyolefin resin in the above-mentioned embodiment (1) include a random copolymer or a block copolymer obtained by copolymerizing an olefin with a monomer including an unsaturated carboxylic acid and/or a derivative thereof, a graft copolymer obtained by graft-polymerizing a monomer including an unsaturated carboxylic acid and/or a derivative thereof onto an unmodified polyolefin resin, and the like.

Examples of the above-mentioned unsaturated carboxylic acid include maleic acid, fumaric acid, itaconic acid, acrylic acid, methacrylic acid and the like. In addition, the derivative includes an ester, an amide, an imide and a metal salt of the carboxylic acid, and the like. Specific examples include methyl (meth)acrylate, ethyl (meth)acrylate, butyl (meth)acrylate, glycidyl (meth)acrylate, maleic acid monoethyl ester, maleic acid diethyl ester, fumaric acid monoethyl ester, fumaric acid diethyl ester, acrylamide, methacrylamide, maleic acid monoamide, maleic acid diamide, fumaric acid monoamide, fumaric acid diamide, maleimide, N-butyl maleimide, sodium methacrylate and the like. Among these, a compound having no free carboxyl group can form a carboxyl group by hydrolysis or the like after the polymerization.

Examples of the olefin-based resin having carboxyl group include an olefin•(meth)acrylic acid-based copolymer such as ethylene•(meth)acrylic acid copolymer, propylene•(meth)acrylic acid copolymer, ethylene•α-olefin•(meth)acrylic acid copolymer and ethylene•(meth)acrylic acid•maleic anhydride copolymer; a polyolefin modified with (meth)acrylic acid, an ethylene•α-olefin-based copolymer modified with (meth)acrylic acid, a polyolefin modified with maleic acid, an ethylene•α-olefin-based copolymer modified with maleic acid, and the like.

A modified content by a carboxyl group in the modified polyolefin resin (content of a unit derived from an unsaturated carboxylic acid) according to the above-mentioned embodiment (1) is not particularly limited and is usually in the range from 0.1% to 40% by weight based on the total monomer units constituting the modified polyolefin resin.

Examples of the modified polyolefin resin according to the above-mentioned embodiments (2) to (5) include a random copolymer or a block copolymer obtained by copolymerizing an olefin with an unsaturated acid anhydride, an unsaturated compound having epoxy group, an unsaturated compound having hydroxyl group, or an unsaturated compound having cyano group; a graft copolymer obtained by graft-polymerizing a monomer including an unsaturated acid anhydride, an unsaturated compound having epoxy group, an unsaturated compound having hydroxyl group, or an unsaturated compound having cyano group onto an unmodified polyolefin resin; in a similar manner as the above-mentioned embodiment (1), and the like.

Examples of the above-mentioned acid anhydride include maleic anhydride, citraconic anhydride, itaconic anhydride, tetrahydrophthalic anhydride, nadic anhydride, methylnadic anhydride, succinic 2-octene-1-yl anhydride, succinic 2-dodecene-1-yl anhydride, succinic 2-octadecene-1-yl anhydride, 2,3-dimethylmaleic anhydride, bromomaleic anhydride, dichloromaleic anhydride, 1-butene-3,4-dicarboxylic acid anhydride, 1-cyclopentene-1,2-dicarboxylic acid anhydride and the like. Examples of the above-mentioned olefin-based resin having acid anhydride group include ethylene•maleic anhydride copolymer, maleic acid anhydride-graft polyolefin and the like.

Examples of the above-mentioned unsaturated compound having epoxy group include an unsaturated glycidyl ester such as glycidyl (meth)acrylate; an unsaturated glycidylether such as allyl glycidylether and methallyl glycidylether; an epoxyalkene; p-glycidyl styrene, and the like.

Examples of the olefin-based resin having epoxy group include an olefin•glycidyl (meth)acrylate copolymer such as ethylene-glycidyl (meth)acrylate copolymer; an olefin•alkyl (meth)acrylate•glycidyl (meth)acrylate copolymer such as ethylene•methyl (meth)acrylate•glycidyl (meth)acrylate copolymer and ethylene•ethyl (meth)acrylate•glycidyl (meth)acrylate copolymer; an olefin•vinyl acetate•glycidyl (meth)acrylate copolymer such as ethylene•vinyl acetate•glycidyl (meth)acrylate copolymer, and the like.

Examples of the unsaturated compound having hydroxyl group include a (meth)acrylate such as 2-hydroxyethyl (meth)acrylate, 2-hydroxypropyl (meth)acrylate, 3-hydroxypropyl (meth)acrylate, 2-hydroxybutyl (meth)acrylate and polyethyleneglycol monomethacrylate; an unsaturated alcohol such as allyl alcohol, 9-decene-1-ol and 10-undecene-1-ol; a vinylether such as 2-hydroxy vinylether; an allylether such as 2-hydroxyethyl allylether, and the like.

Examples of the unsaturated compound having cyano group (cyanidated vinyl compound) include acrylonitrile, methacrylonitrile, maleinnitrile, fumaronitrile, mesaconnitrile, citraconnitrile, itaconnitrile and the like.

The modified polyolefin resins according to the above-mentioned embodiments (6) and (7) are respectively a graft copolymer which is obtained by polymerizing a polymerizable unsaturated monomer in the presence of an olefin-based resin having epoxy group, and a graft copolymer which is obtained by polymerizing a polymerizable unsaturated monomer containing an aromatic vinyl compound and a cyanidated vinyl compound in the presence of an unmodified olefin-based resin.

The olefin-based resin having epoxy group used for the modified polyolefin according to the above-mentioned embodiment (6) may be the same as the modified polyolefin according to the embodiment (3) to use and is preferably a resin in which modifying amount by epoxy group (unit content derived from an unsaturated compound having epoxy group) is preferably in the range from 0.1% to 40% by weight and more preferably from 3% to 30% by weight with respect to the total of monomer units constituting the modified resin.

In addition, the above-mentioned polymerizable unsaturated monomer may be an aromatic vinyl compound and a cyanidated vinyl compound. Further, it may be one where a (meth)acrylic acid ester compound and the like are also added to them. Preferable amounts of the aromatic vinyl compound and the cyanidated vinyl compound are respectively from 60% to 80% by weight and from 20% to 40% by weight with respect to 100% by weight of the total of these compounds. When these compounds are used in the ranges, impact resistance is excellent.

The production method for the modified polyolefin resin according to the above-mentioned embodiment (6) is one wherein a polymerizable unsaturated monomer containing an aromatic vinyl compound and a cyanidated vinyl compound is graft-polymerized in the presence of an olefin-based resin having epoxy group and is almost the same as the production method for the above-mentioned rubber-reinforced copolymeric resin (A1).

Examples of other production method include a method where an acrylonitrile•styrene copolymer having —O—O— bond in its molecule is subjected to addition to an olefin-based resin having epoxy group. This method is where a copolymer of a radical-polymerizable unsaturated compound having a peroxide bond, an aromatic vinyl compound and a cyanidated vinyl compound, and an olefin-based resin having epoxy group are subjected to a radical additional reaction in an extruder (kneader) or a solution and to grafting.

The modified olefin resin according to the above-mentioned embodiment (7) may be the same construction as the modified olefin resin according to the above-mentioned embodiment (6).

The content of the above-mentioned modified polyolefin resin in the thermoplastic resin composition of the present invention is preferably in the range from 0.05 to 15 parts by weight, more preferably from 0.1 to 10 parts by weight, and further preferably from 0.5 to 8 parts by weight with respect to 100 parts by weight of the component [A]. When the content of the above-mentioned modified polyolefin resin is in the above range, miscibility among the above-mentioned component [A], [B] and [C] will be improved and moldability will also be improved. In addition, a molded article in which weld portion is hard to break can be formed.

1-5. Additives

The thermoplastic resin composition may be one comprising an additive depending on purpose or application.

Examples of the above-mentioned additive include an antioxidant, an ultra violet absorber, a weather resisting agent, an anti-aging agent, a filler, an antistatic agent, a flame retardant, an anti-fogging agent, a lubricant, an anti-bacterial agent, an anti-fungal agent, a tackifier, a plasticizer, a coloring agent and the like.

Examples of the antioxidant include hindered amines; hydroquinones; hindered phenols; a phosphorus-based compound; a sulfur-containing compound and the like. These may be used singly or in combination of two or more types thereof.

Examples of the hindered phenols include 2,6-di-tert-butyl-p-cresol, 2,6-di-tert-butylphenol, 2,4-dimethyl-6-tert-butylphenol, tert-butylhydroxyanisol, 3-(3',5'-di-tert-butyl-4'-hydroxyphenyl)-N-octadecylpropionate, 2,2'-methylenebis-(4-methyl-6-tert-butylphenol), 4,4'-butylidenebis-(3-methyl-6-tert-butylphenol), 4,4'-thiobis-(3-methyl-6-tert-butylphenol), tetrakis-[methylene-3-(3',5'-di-tert-butyl-4'-hydroxyphenyl)propionate]methane, 1,1,3-tris(2-methyl-4-hydroxy-5-tert-butylphenyl)butane, tris(3,5-di-tert-butyl-4-hydroxybenzyl)isocyanurate, 2-tert-butyl-6-(3-tert-butyl-2-hydroxy-5-methylbenzyl)-4-methylphenylacrylate, and the like.

Examples of the phosphorus-based compound include pentaerythritol diphosphite, an alkyldiaryl phosphate and the like.

The content of the above-mentioned antioxidant is usually in the range from 0.01 to 5 parts by weight with respect to 100 parts by weight of the total of the above-mentioned component [A], [B] and [C].

Examples of the ultra violet absorber include benzophenones, benzotriazoles, a salicylic acid ester, a metal complex salt and the like. These may be used singly or in combination of two or more types thereof.

The content of the ultra violet absorber is usually in the range from 0.01 to 5 parts by weight with respect to 100 parts by weight of the total of the above-mentioned component [A], [B] and [C].

Examples of the weather resisting agent include an organic phosphorus-based compound, an organic sulfur-based compound, an organic compound having hydroxyl group, and the like. These may be used singly or in combination of two or more types thereof.

The content of the weather resisting agent is usually in the range from 0.01 to 5 parts by weight with respect to 100 parts by weight of the total of the above-mentioned component [A], [B] and [C].

Examples of the anti-aging agent include a naphtylamine-based compound, a diphenylamine-based compound, p-phenylenediamine-based compound, a quinoline-based compound, a hydroquinone-based compound, a monophenol-based compound, a bisphenol-based compound, a trisphenol-based compound, a polyphenol-based compound, a thiobisphenol-based compound, a hindered phenol-based compound, a phosphate ester-based compound, an imidazol-based compound, a dithiocarbamic acid nickel salt-based compound, a phosphate-based compound and the like. These may be used singly or in combination of two or more types thereof.

The content of the anti-aging agent is usually in the range from 0.01 to 5 parts by weight with respect to 100 parts by weight of the total of the above-mentioned component [A], [B] and [C].

Examples of the filler include carbon black, silica, talc, titanium oxide, clay, calcium carbonate and the like. These may be used singly or in combination of two or more types thereof.

The content of the filler is usually in the range from 1 to 50 parts by weight with respect to 100 parts by weight of the total of the above-mentioned component [A], [B] and [C].

Examples of the anti-static agent include a low molecular weight type anti-static agent, a polymer type anti-static agent and the like. In addition, these may be ion-conductive or electron-conductive.

Examples of the low molecular weight type anti-static agent include an anion-based anti-static agent, a cation-based anti-static agent, a nonion-based anti-static agent, an amphoteric-based anti-static agent, a complexed compound, a metal alkoxide such as an alkoxysilane, an alkoxytitanium and an alkoxyzirconium, and derivatives thereof, and the like.

In addition, examples of the polymer type anti-static agent include a vinyl copolymer having a sulfonate in its molecule, an alkylsulfonate, an alkylbenzenesulfonate, betaine and the like. A polyether, a polyamide elastomer, polyester elastomer and the like may be also used.

The content of the anti-static agent is usually in the range from 0.1 to 20 parts by weight with respect to 100 parts by weight of the total of the above-mentioned component [A], [B] and [C].

The flame retardant includes an organic-based flame retardant, an inorganic-based flame retardant, a reactive flame retardant and the like. These may be used singly or in combination of two or more types thereof.

Examples of the organic-based flame retardant include a halogen-based flame retardant such as a brominated epoxy-based compound, a brominated alkyltriazine compound, a brominated bisphenol-based epoxy resin, a brominated bisphenol-based phenoxy resin, a brominated bisphenol-based polycarbonate resin, a brominated polystyrene resin, a brominated cross-linked polystyrene resin, a brominated bisphenol cyanurate resin, a brominated polyphenylene ether, a decabromodiphenyl oxide, and tetrabromobisphenol A and an oligomer thereof; a phosphorus-based flame retardant including a phosphoric acid ester such as trimethyl phosphate, triethyl phosphate, tripropyl phosphate, tributyl phosphate, tripentyl phosphate, trihexyl phosphate, tricyclohexyl phosphate, triphenyl phosphate, tricresyl phosphate, trixylenyl phosphate, cresyl diphenyl phosphate, dicresyl phenyl phosphate, dimethyl ethyl phosphate, methyl dibutyl phosphate, ethyl dipropyl phosphate and hydroxyphenyl diphenyl phosphate, as well as compounds obtained by modifying these compounds with various substituents, various condensed phosphoric acid ester compounds, and a phosphazene derivative comprising elemental phosphorus and nitrogen; polytetrafluoroethylene and the like. These may be used singly or in combination of two or more types thereof.

Examples of the inorganic flame retardant include aluminum hydroxide, antimony oxide, magnesium hydroxide, zinc borate, a zirconium-based compound, a molybdenum-based compound, zinc stannate, a guanidine salt, a silicone-based compound, a phosphazene-based compound and the like. These may be used singly or in combination of two or more types thereof.

Examples of the reactive flame retardant include tetrabromobisphenol A, dibromophenol glycidyl ether, a brominated aromatic triazine, tribromophenol, tetrabromophthalate, tetrachlorophthalic anhydride, dibromoneopentyl glycol, poly(pentabromobenzyl polyacrylate), chlorendic acid (HET acid), chlorendic anhydride (HET anhydride), brominated phenol glycidyl ether, dibromocresyl glycidyl ether and the like. These may be used singly or in combination of two or more types thereof.

The content of the above-mentioned flame retardant is usually in the range from 1 to 50 parts by weight with respect to 100 parts by weight of the total of the above-mentioned components [A], [B] and [C].

When the flame retardant is formulated in the present composition, it is preferable that a flame retardant auxiliary is used together. Examples of the flame retardant auxiliary include an antimony compound such as diantimony trioxide, diantimony tetraoxide, diantimony pentoxide, sodium antimonite and antimony tartrate; zinc borate, barium metaborate, alumina hydrate, zirconium oxide, ammonium polyphosphate, tin oxide, iron oxide and the like. These may be used singly or in combination of two or more types thereof.

In the case where the present resin composition is a flame retarded composition, heat resistance is sometimes deteriorated. And it is preferable to use a non-flame retarded composition.

Examples of the lubricant include a metal soap, a higher fatty acid, a fatty acid ester, an oxy fatty acid, a fatty amide, an alkylene-bis-fatty acid amide, an aliphatic ketone, a fatty acid ester of a lower alcohol, a fatty acid ester of a polyhydric alcohol, a fatty acid ester of a polyglycol, an aliphatic alcohol, a polyhydric alcohol, a polyglycol, a polyglycerol, hydrocarbon resins, paraffins, silicones, modified silicones and the like. These may be used singly or in combination of two or more types thereof.

Examples of the metal soap include zinc stearate, zinc behenate, magnesium behenate and the like.

Examples of the higher fatty acid include a compound having carbon atoms of 21 or more, such as behenic acid and montanic acid, and the like.

Examples of the fatty acid ester include a diester of montanic acid and ethylene glycol, and the like.

Examples of the fatty amide include a saturated fatty acid monoamide such as lauric acid amide, palmitic acid amide, stearic acid amide, behenic acid amide and hydroxystearic acid amide; an saturated fatty acid monoamide such as oleic acid amide, erucic acid amide and ricinolic acid amide; a substituted amide such as N-stearylstearic acid amide, N-oleyloleic acid amide, N-stearyloleic acid amide, N-oleylstearic acid amide, N-stearylerucic acid amide, N-oleylpalmitic acid amide, methylolstearic acid amide and methylolbehenic acid amide; and the like.

Additionally, examples of the alkylene-bis fatty acid amide include methylene-bis-stearic acid amide, ethylene-bis-capric acid amide, ethylene-bis-lauric acid amide, ethylene-bis-stearic acid amide, ethylene-bis-isostearic acid amide, ethylene-bis-hydroxystearic acid amide, ethylene-bis-behenic acid amide, hexamethylene-bis-hydroxystearic acid amide, N,N'-distearyladipic acid amide, N,N'-distearylsebacic acid amide and the like.

The content of the lubricant is usually in the range from 0.01 to 10 parts by weight with respect to 100 parts by weight of the total of the above-mentioned component [A], [B] and [C].

The thermoplastic resin composition of the present invention can be prepared by kneading starting materials with an extruder, Banbury mixer, a kneader, a roll, a feeder ruder or the like to form a pellet in specified shape. The kneading temperature is selected depending on types of the rubber-reinforced resin and is usually in the range from 180° C. to 300° C., and preferably from 200° C. to 280° C. Using method of the starting materials is not particularly limited and kneading may be initiated after charging all of the starting materials or be conducted while charging them with multi-step or dividedly.

The thermoplastic resin composition of the present invention is excellent in chemical resistance. The time until cracking occurs in a molded article of specific shape (a plate-shaped molded article of 12.7 mm×127 mm×1.6 mm) that has been stressed to achieve 2% bending strain, coated with dioctyl phthalate, and left to stand at a temperature of 23° C., is preferably 60 minutes or more, more preferably 90 minutes or more, and further preferably 120 minutes or more. Applications of the molded article may be limited if cracking occurs early. In particular, mechanical strength may be decreased particularly when skin oils or creams seep into the molded article upon contact with a human body.

Additionally, the thermoplastic resin composition of the present invention is excellent in heat resistance. Vicat softening temperature (load: 9.8 N) measured in accordance with ASTM D1525 is preferably 95° C. or higher, more preferably 100° C. or higher, and further preferably 105° C. or higher. If this Vicat softening temperature is too low, applications of the molded article may be limited. When such a molded article is used at high temperature of, e.g., 50° C. or higher, an undesirable phenomenon such as deformation may be observed.

Further, when the molded article having a weld portion is produced using the thermoplastic resin composition of the present invention, mechanical strength at the weld portion is more sufficient than that of a molded article comprising a conventional thermoplastic resin composition and the weld portion is hard to break.

2. Molded Article

The thermoplastic resin composition of the present invention can be made into a molded article in prescribed shape by injection molding, press molding, extrusion molding, coextrusion molding, sheet-extrusion molding, profile extrusion molding, expansion molding, vacuum molding, compression molding, cast molding, roll molding, or other well-known molding methods. That is, the present molded article comprises the above-mentioned thermoplastic resin composition.

Improvement in strength and lightening of the molded article used for a variety of parts are advanced. The shape thereof has been also complicated. Although lightening in a molded article having a thinner part, for instance, is realized, a melt resin is not sufficiently filled into a mold during injection molding. Therefore, a multiple gates (flow pathways) system having two or more gates is usually applied. Additionally, there is a case where multiple gates are required. When a molded article having a weld portion according to this method was produced, strength at a weld portion sometimes lowered. However, since the molded article of the present invention comprises the thermoplastic resin composition of the present invention, strength at the weld portion is excellent.

Examples of the molded article obtained by the above-mentioned methods may include a component for a vehicle interior such as instrument panels, console boxes, glove compartments, meter panels, door ornaments, switch panels, center cluster panels, dashboards, door trim, roof trim, rear-side trim, trunk-room trim and handles; an interior component for home electronics appliance such as liners and housing liners; an industrial parts; and the like.

The molded article of the present invention may also be subjected to secondary processing such as painting, plating, sputtering and welding.

EXAMPLES

Hereinafter, the present invention will be described in greater detail by referring to Examples. The present invention is in no way limited by these Examples. In addition, "part" and "%" in the following are based on weight unless otherwise indicated.

1. Method of Evaluation

The following is a description for measuring method of evaluation items in Example and Comparative Example. The method for manufacturing a test piece used in the evaluations is as follows.

Starting materials was fed into a φ40-mm single-screw extruder to extrude in a condition of a cylinder temperature at 240° C., and pellets (of the thermoplastic resin composition) were manufactured. After that, these pellets were fed into a 3.5-ounce screw-type injection molding machine, and a test piece having a prescribed shape was manufactured at a cylinder temperature of 230° C.

(1) Fluidity

Melt mass-flow rate (MFR, temperature: 240° C.; load: 98 N) was measured in accordance with ISO 1133.

(2) Impact Resistance

Charpy impact strength was measured in accordance with ISO 179.

(3) Bending Elastic Modulus

Measurement was performed in accordance with ISO 178.

(4) Vicat Softening Temperature

Measurement was performed at a load of 9.8 N in accordance with ASTM D1525.

(5) Appearance of Molded Article

A flat plate-shaped molded article (50 mm×80 mm×2.4 mm) of 0.2-mm thick fan gates was obtained at a cylinder temperature of 240° C. and a mold temperature of 50° C. The gate was then bent by hand and judged in the following criteria.

O: Peeling in laminae was not caused.
X: Peeling in laminae was caused.

(6) Chemical Resistance

A flat plate-shaped molded article (12.7 mm×127 mm×1.6 mm) was immobilized with 2%-strain jigs, coated with dioctyl phthalate, and left to stand at 23° C. After that, a surface of the molded article was visually observed, and the time until cracking occurred was measured. ">360" was used in Tables 1 and 2 for molded articles in which no cracking was observed after 360 min.

(7) Mechanical Strength at Weld Portion

As a test piece, a flat plate-shaped molded article (12.7 mm×127 mm×1.6 mm) having a weld portion in the center was used, which was obtained via two gates on either end at a cylinder temperature of 240° C., a mold temperature of 50° C., an injection pressure of 100 MPa, and an injection rate of 50 mm/s. The test piece was subjected to a bending test in the condition of a span at 50 mm and at a rate of 30 mm/s, and rupture displacement was measured.

2. Starting Material for Thermoplastic Resin Composition

Starting materials used in preparing the thermoplastic resin compositions are shown below.

2-1. Component [A]

(1) Rubber-reinforced Copolymeric Resin (A1-1)

It is a copolymeric resin obtained by emulsion polymerization of styrene, α-methyl styrene and acrylonitrile in the presence of a polybutadiene rubber having a volume-average particle diameter of 280 nm. Polybutadiene/styrene/α-methyl styrene/acrylonitrile=17/23/37/23 (%), graft ratio is 40%, and intrinsic viscosity (measured in methylethylketone at a temperature of 30° C.) of a component dissolved by acetone is 0.45 dl/g.

(2) Rubber-reinforced Copolymeric Resin (A1-2)

It is a copolymeric resin obtained by emulsion polymerization of styrene and acrylonitrile in the presence of a polybutadiene rubber having a volume-average particle diameter of 280 nm. Polybutadiene/styrene/acrylonitrile=60/30/10 (%), graft ratio is 40%, and intrinsic viscosity (measured in methylethylketone at a temperature of 30° C.) of a component dissolved by acetone is 0.35 dl/g.

(3) Rubber-reinforced Copolymeric Resin (A1-3)

It is a copolymeric resin obtained by emulsion polymerization of styrene and acrylonitrile in the presence of an acryl-based rubber (a polymer obtained by emulsion polymerization of 99 parts of n-butyl acrylate and 1 part or allyl methacrylate) having a volume-average particle diameter of 100 nm. Acryl-based rubber/styrene/acrylonitrile=50/37/13 (%), graft ratio is 60%, and intrinsic viscosity (measured in methylethylketone at a temperature of 30° C.) of a component dissolved by acetonitrile is 0.46 dl/g.

(4) Rubber-reinforced Copolymeric Resin (A1-4)

A copolymeric resin obtained by solution polymerization of styrene and acrylonitrile in the presence of an ethylene•propylene-based rubber (trade name "EP84" manufactured by JSR Corporation) in a toluene solvent. Ethylene-propylene-based rubber/styrene/acrylonitrile=30/46/24 (%), graft ratio is 55%, and intrinsic viscosity (measured in methylethylketone at a temperature of 30° C.) of a component dissolved by acetonitrile is 0.5 dl/g.

(5) Rubber-reinforced Copolymeric Resin (A1-5)

It is a copolymeric resin obtained by emulsion polymerization of styrene, α-methyl styrene and acrylonitrile in the presence of a polybutadiene rubber having a volume-average particle diameter of 280 nm. Polybutadiene/styrene/α-methyl styrene/acrylonitrile=44/34/8/14 (%), graft ratio is 60%, and intrinsic viscosity (measured in methylethylketone at a temperature of 30° C.) of a component dissolved by acetone is 0.3 dl/g.

(6) Acrylonitrile•Styrene Copolymer (A2-1)
Styrene/acrylonitrile=74/26 (%), and intrinsic viscosity (measured in methylethylketone at a temperature of 30° C.) is 0.3 dl/g.
(7) Acrylonitrile•α-methylstyrene Copolymer (A2-2)
α-Methylstyrene/acrylonitrile=72/28 (%), and intrinsic viscosity (measured in methylethylketone at a temperature of 30° C.) is 0.5 dl/g.
(8) Acrylonitrile•styrene•α-methylstyrene Copolymer (A2-3)
Styrene/α-methylstyrene/acrylonitrile=4/70/26 (%), and intrinsic viscosity (measured in methylethylketone at a temperature of 30° C.) is 0.4 dl/g.
(9) Styrene•N-phenylmaleimide Copolymer (A2-4)
Styrene/N-phenylmaleimide=56/44 (%), and intrinsic viscosity (measured in dimethylformamide at a temperature of 30° C.) is 0.51 dl/g.
(10) Acrylonitrile•styrene•N-phenylmaleimide Copolymer (A2-5)
Styrene/acrylonitrile/N-phenylmaleimide=35/25/40 (%), and intrinsic viscosity (measured in dimethylformamide at a temperature of 30° C.) is 0.59 dl/g.

2-2. Component [B]
Ethylene•(meth)acrylic acid ester•carbon monoxide copolymer (trade name "ELVALOY HP-4051" manufactured by Du Pont-Mitsui Polychemicals Co., Ltd.) was used. MFR (temperature: 200° C.; load: 19.6 N) according to JIS K7210 is 12 g/10 min.

2-3. Component [C]
Polytetrafluoroethylene (trade name "BLENDEX 449" manufactured by GE Specialty Chemicals Inc.) was used.

2-4. Modified Polyolefin Resin
(D-1): A graft copolymer (trade name "MODIPER A4400" manufactured by NOF Corporation) in which 30 parts of an acrylonitrile•styrene copolymer is grafted onto 70 parts of an ethylene•glycidyl methacrylate copolymer (ethylene/glycidyl methacrylate=85/15 (%)) was used.
(D-2): A graft copolymer (trade name "MODIPER A1400" manufactured by NOF Corporation) in which 30 parts of an acrylonitrile•styrene copolymer is grafted onto 70 parts of an ethylene polymer was used.
(D-3): A glycidyl methacrylate-modified polyethylene (trade name "BONDFAST E" manufactured by Sumitomo Chemical Co., Ltd.)
(D-4): A carboxylic acid anhydride modified polyethylene whose acid value is 30 (trade name "YUMEX 2000" manufactured by Sanyo Chemical Industries, Ltd.) was used.

2-5. Antioxidant
(1) 3-(3',5'-di-tert-butyl-4'-hydroxyphenyl)-N-octadecyl propionate (P-1)
"ADKSTAB AO-50" (trade name) manufactured by ADEKA Corporation was used.
(2) Bis(2,6-di-tert-butyl-4-methylphenyl)pentaerythritol diphosphite (P-2)
"ADKSTAB PEP-36" (trade name) manufactured by ADEKA Corporation was used.

2-6. Lubricant
Ethylene bisstearyl amide (trade name "KAOWAX EB-P" manufactured by KAO Corporation) was used.

3. Production and Evaluation of Thermoplastic Resin Composition

Examples 1 to 14 and Comparative Examples 1 to 4

The above-mentioned components [A] to [C], antioxidant and lubricant were used to produce pellets and various evaluations were conducted. The results are listed in Tables 1 to 4.

TABLE 1

| | | | | | Example | | | | |
|---|---|---|---|---|---|---|---|---|---|
| | | | | | 1 | 2 | 3 | 4 | 5 |
| Thermoplastic resin composition | Formulation (part) | Component [A] | Copolymeric resin | A1-1 | 100 | | | | |
| | | | | A1-2 | | 26.7 | 33.4 | 25 | |
| | | | | A1-3 | | | | | 40 |
| | | | | A1-4 | | | | | |
| | | | | A1-5 | | | | | |
| | | | Copolymer | A2-1 | | 3.9 | 22.6 | 36.4 | 23 |
| | | | | A2-2 | | 69.4 | 16.7 | | |
| | | | | A2-3 | | | | | 14.3 |
| | | | | A2-4 | | | 27.3 | 38.6 | 22.7 |
| | | | | A2-5 | | | | | |
| | | Component [B] | | | 3 | 5 | 3 | 5 | 5 |
| | | Component [C] | | | 0.5 | 0.5 | 0.3 | 1 | 0.2 |
| | | Antioxidant | | P-1 | 0.3 | 0.3 | 0.3 | 0.3 | 0.3 |
| | | | | P-2 | 0.1 | 0.1 | 0.1 | 0.1 | 0.1 |
| | | Lubricant | | | 0.5 | 0.5 | 0.5 | 0.5 | 0.5 |
| | Characteristic | Rubbery polymer content (%) | | | 17 | 16 | 20 | 15 | 20 |
| | | α-Methylstyrene unit content (%) | | | 37 | 50 | 12 | 0 | 10 |
| | | Maleimide compound unit content (%) | | | — | — | 12 | 17 | 10 |
| | | Total content of α-methylstyrene unit and maleimide compound unit (%) | | | 37 | 50 | 24 | 17 | 20 |
| Evaluation | | MFR (g/10 min.) | | | 20 | 12 | 13 | 10 | 11 |
| | | Charpy impact strength (kJ/m$^2$) | | | 20 | 15 | 17 | 11 | 10 |
| | | Bending modulus (MPa) | | | 2290 | 2320 | 2290 | 2340 | 2310 |
| | | Vicat softening temperature (° C.) | | | 121 | 124 | 125 | 129 | 120 |
| | | Appearance | | | ○ | ○ | ○ | ○~x | ○ |
| | | Crack-observed time (min.) | | | >360 | >360 | >360 | >360 | >360 |
| | | Rupture displacement at weld portion (mm) | | | — | 4.6 | — | — | 6.1 |

TABLE 2

| | | | | | Example | | | | |
|---|---|---|---|---|---|---|---|---|---|
| | | | | | 6 | 7 | 8 | 9 | 10 |
| Thermoplastic resin composition | Formulation (part) | Component [A] | Copolymeric resin | A1-1 | | | | | |
| | | | | A1-2 | | 6.7 | | 30 | 12.5 |
| | | | | A1-3 | | | | | |
| | | | | A1-4 | 60 | | | | |
| | | | | A1-5 | | | 100 | | |
| | | | Copolymer | A2-1 | 2.1 | 35 | | 60.9 | |
| | | | | A2-2 | | 58.3 | | | 87.5 |
| | | | | A2-3 | 22.9 | | | | |
| | | | | A2-4 | | | | 9.1 | |
| | | | | A2-5 | 15 | | | | |
| | | Component [B] | | | 10 | 5 | 5 | 5 | 5 |
| | | Component [C] | | | 0.5 | 0.5 | 0.5 | 0.5 | 0.5 |
| | | Antioxidant | | P-1 | 0.3 | 0.3 | 0.3 | 0.3 | 0.3 |
| | | | | P-2 | 0.1 | 0.1 | 0.1 | 0.1 | 0.1 |
| | | Lubricant | | | 0.5 | 0.5 | 0.5 | 0.5 | 0.5 |
| | Characteristic | Rubbery polymer content (%) | | | 18 | 4 | 44 | 18 | 7.5 |
| | | α-Methylstyrene unit content (%) | | | 16 | 42 | 8 | 0 | 63 |
| | | Maleimide compound unit content (%) | | | 6 | — | — | 4 | 0 |
| | | Total content of α-methylstyrene unit and maleimide compound unit (%) | | | 22 | 42 | 8 | 4 | 63 |
| Evaluation | | MFR (g/10 min.) | | | 20 | 16 | 8 | 32 | 4 |
| | | Charpy impact strength (kJ/m$^2$) | | | 12 | 2 | 52 | 18 | 3 |
| | | Bending modulus (MPa) | | | 2180 | 2420 | 1790 | 2300 | 2390 |
| | | Vicat softening temperature (° C.) | | | 119 | 122 | 96 | 104 | 131 |
| | | Appearance | | | ○ | ○ | ○ | ○ | ○ |
| | | Crack-observed time (min.) | | | >360 | >360 | >360 | 120 | >360 |

TABLE 3

| | | | | | Example | | | |
|---|---|---|---|---|---|---|---|---|
| | | | | | 11 | 12 | 13 | 14 |
| Thermoplastic resin composition | Formulation (part) | Component [A] | Copolymeric resin | A1-1 | | | | |
| | | | | A1-2 | 10.7 | 8 | 13.3 | 26.7 |
| | | | | A1-3 | 19.2 | 22.4 | 24 | |
| | | | | A1-4 | | | | |
| | | | | A1-5 | | | | |
| | | | Copolymer | A2-1 | 0.7 | 0.2 | 25.7 | 73.3 |
| | | | | A2-2 | 69.4 | 69.4 | | |
| | | | | A2-3 | | | 14.3 | |
| | | | | A2-4 | | | 22.7 | |
| | | | | A2-5 | | | | |
| | | Component [B] | | | 5 | 5 | 5 | 5 |
| | | Component [C] | | | 0.5 | 0.5 | 0.2 | 0.5 |
| | | Antioxidant | | P-1 | 0.3 | 0.3 | 0.3 | 0.3 |
| | | | | P-2 | 0.1 | 0.1 | 0.1 | 0.1 |
| | | Lubricant | | | 0.5 | 0.5 | 0.5 | 0.5 |
| | Characteristic | Rubbery polymer content (%) | | | 16 | 16 | 20 | 16 |
| | | α-Methylstyrene unit content (%) | | | 50 | 50 | 10 | — |
| | | Maleimide compound unit content (%) | | | — | — | 10 | — |
| | | Total content of α-methylstyrene unit and maleimide compound unit (%) | | | 50 | 50 | 20 | — |
| Evaluation | | MFR (g/10 min.) | | | 10 | 9 | 12 | 65 |
| | | Charpy impact strength (kJ/m$^2$) | | | 12 | 13 | 12 | 14 |
| | | Bending modulus (MPa) | | | 2330 | 2340 | 2290 | 2210 |
| | | Vicat softening temperature (° C.) | | | 124 | 125 | 120 | 102 |
| | | Appearance | | | ○ | ○ | ○ | ○ |
| | | Crack-observed time (min.) | | | >360 | >360 | >360 | >360 |
| | | Rupture displacement at weld portion (mm) | | | 5.6 | 5.8 | 5.9 | 4.4 |

TABLE 4

| | | | | | Comparative Example | | | |
|---|---|---|---|---|---|---|---|---|
| | | | | | 1 | 2 | 3 | 4 |
| Thermoplastic resin composition | Formulation (part) | Component [A] | Copolymeric resin | A1-1 | | 100 | | |
| | | | | A1-2 | 30 | | 36.7 | 16.7 |
| | | | | A1-3 | | | | |

TABLE 4-continued

|  |  |  |  | Comparative Example | | | |
|---|---|---|---|---|---|---|---|
|  |  |  |  | 1 | 2 | 3 | 4 |
|  |  | Copolymer | A1-4 |  |  |  |  |
|  |  |  | A1-5 |  |  |  |  |
|  |  |  | A2-1 | 30.3 |  | 23.5 | 53.4 |
|  |  |  | A2-2 | 30.6 |  |  | 20.8 |
|  |  |  | A2-3 |  |  | 17.1 |  |
|  |  |  | A2-4 | 9.1 |  | 22.7 | 9.1 |
|  |  |  | A2-5 |  |  |  |  |
|  | Component [B] |  |  |  | 25 | 5 | 3 |
|  | Component [C] |  |  | 0.5 | 0.5 |  | 6 |
|  | Antioxidant |  | P-1 | 0.3 | 0.3 | 0.3 | 0.3 |
|  |  |  | P-2 | 0.1 | 0.1 | 0.1 | 0.1 |
|  | Lubricant |  |  | 0.5 | 0.5 | 0.5 | 0.5 |
| Characteristic | Rubbery polymer content (%) |  |  | 18 | 17 | 22 | 17 |
|  | α-Methylstyrene unit content (%) |  |  | 22 | 37 | 12 | 15 |
|  | Maleimide compound unit content (%) |  |  | 4 | — | 10 | 4 |
|  | Total content of α-methylstyrene unit and maleimide compound unit (%) |  |  | 26 | 37 | 22 | 19 |
| Evaluation | MFR (g/10 min.) |  |  | 13 | 16 | 10 | 18 |
|  | Charpy impact strength (kJ/m$^2$) |  |  | 16 | 18 | 22 | 2 |
|  | Bending modulus (MPa) |  |  | 2330 | 1760 | 2280 | 2260 |
|  | Vicat softening temperature (° C.) |  |  | 127 | 106 | 121 | 111 |
|  | Appearance |  |  | ○ | x | ○ | x |
|  | Crack-observed time (min.) |  |  | 40 | >360 | 50 | — |

The following is clear from Tables 1 to 4.

Comparative Example 1 is an example in which the component [B] is not contained, the time until cracking occurred was short at 40 min., and it is indicated that chemical resistance was poor. Comparative Example 2 is an example in which content of the component [B] is too much and out of the range of the present invention, and peeling in laminae was observed. In addition, Comparative Example 3 is an example in which the component [C] is not contained, the time until cracking occurred was short at 50 min., and it is indicated that chemical resistance was poor. Comparative Example 4 is an example in which content of the component [C] is too much and out of the range of the present invention, and appearance was inferior. And pellets were difficult to form using an extruder, being a problem with productivity. In Comparative Example 4, the time until cracking occurred could not be judged due to the roughness of the surface of the molded article.

On the other hand, Examples 1 to 14 exhibited no peeling in laminae, being good appearance. The time until cracking occurred was more than 360 min., and an excellent balance between Charpy impact strength (impact resistance) and Vicat softening temperature (heat resistance) was obtained.

It is noted that when compositions in Examples 1 to 14 were subjected to an ordinarily injection molding method not two-points gate type, obtained molded articles (12.7 mm×127 mm×1.6 mm) were not broken by bending test.

Examples 15 to 24 and Comparative Examples 5 to 8

The above-mentioned components [A] to [C], modified polyolefin resin, antioxidant and lubricant were used to produce pellets and various evaluations were conducted. The results are listed in Tables 5 to 7.

TABLE 5

|  |  |  |  |  | Example | | | | |
|---|---|---|---|---|---|---|---|---|---|
|  |  |  |  |  | 15 | 16 | 17 | 18 | 19 |
| Thermoplastic resin composition | Formulation (part) | Component [A] | Copolymeric resin | A1-2 | 26.7 | 26.7 | 26.7 | 26.7 | 26.7 |
|  |  |  | Copolymer | A2-1 | 3.9 | 3.9 | 3.9 | 3.9 | 3.9 |
|  |  |  |  | A2-2 | 69.4 | 69.4 | 69.4 | 69.4 | 69.4 |
|  |  | Component [B] |  |  | 5 | 5 | 5 | 5 | 5 |
|  |  | Component [C] |  |  | 0.5 | 0.5 | 0.5 | 0.5 | 0.5 |
|  |  | Component [D] |  | D-1 | 1 | 3 |  |  |  |
|  |  |  |  | D-2 |  |  | 1 |  |  |
|  |  |  |  | D-3 |  |  |  | 1 |  |
|  |  |  |  | D-4 |  |  |  |  | 1 |
|  |  | Antioxidant |  | P-1 | 0.3 | 0.3 | 0.3 | 0.3 | 0.3 |
|  |  |  |  | P-2 | 0.1 | 0.1 | 0.1 | 0.1 | 0.1 |
|  |  | Lubricant |  |  | 0.5 | 0.5 | 0.5 | 0.5 | 0.5 |
|  | Characteristic | Rubbery polymer content (%) |  |  | 16 | 16 | 16 | 16 | 16 |
|  |  | α-Methylstyrene unit content (%) |  |  | 50 | 50 | 50 | 50 | 50 |
|  |  | Maleimide compound unit content (%) |  |  | — | — | — | — | — |
|  |  | Total content of α-methylstyrene unit and maleimide compound unit (%) |  |  | 50 | 50 | 50 | 50 | 50 |
| Evaluation | MFR (g/10 min.) |  |  |  | 14 | 16 | 12 | 10 | 11 |
|  | Charpy impact strength (kJ/m$^2$) |  |  |  | 16 | 12 | 14 | 17 | 17 |
|  | Bending modulus (MPa) |  |  |  | 2280 | 2240 | 2290 | 2310 | 2300 |

TABLE 5-continued

|  |  | Example | | | | |
|---|---|---|---|---|---|---|
|  |  | 15 | 16 | 17 | 18 | 19 |
| | Vicat softening temperature (° C.) | 123 | 120 | 121 | 121 | 122 |
| | Appearance | ○ | ○ | ○ | ○ | ○ |
| | Crack-observed time (min.) | >360 | >360 | >360 | >360 | >360 |
| | Rupture displacement at weld portion (mm) | 7.4 | 8.4 | 6.8 | 6.9 | 6.9 |

TABLE 6

| | | | | | Example | | | | |
|---|---|---|---|---|---|---|---|---|---|
| | | | | | 20 | 21 | 22 | 23 | 24 |
| Thermoplastic resin composition | Formulation (part) | Component [A] | Copolymeric resin | A1-2 | 10.7 | | 13.3 | 33.4 | 25 |
| | | | | A1-3 | 19.2 | 40 | 24 | | |
| | | | Copolymer | A2-1 | 0.7 | 23 | 25.7 | 22.6 | 36.4 |
| | | | | A2-2 | 69.4 | | | 16.7 | |
| | | | | A2-3 | | 14.3 | 14.3 | | |
| | | | | A2-4 | | 22.7 | 22.7 | 27.3 | 38.6 |
| | | Component [B] | | | 5 | 5 | 5 | 3 | 5 |
| | | Component [C] | | | 0.5 | 0.2 | 0.2 | 0.3 | 1 |
| | | Component [D] | | D-1 | 1 | 1.5 | 1.5 | 1 | 1.5 |
| | | Antioxidant | | P-1 | 0.3 | 0.3 | 0.3 | 0.3 | 0.3 |
| | | | | P-2 | 0.1 | 0.1 | 0.1 | 0.1 | 0.1 |
| | | Lubricant | | | 0.5 | 0.5 | 0.5 | 0.5 | 0.5 |
| | Characteristic | Rubbery polymer content (%) | | | 16 | 20 | 20 | 20 | 15 |
| | | α-Methylstyrene unit content (%) | | | 50 | 10 | 10 | 12 | — |
| | | Maleimide compound unit content (%) | | | — | 10 | 10 | 12 | 17 |
| | | Total content of α-methylstyrene unit and maleimide compound unit (%) | | | 50 | 20 | 20 | 24 | 17 |
| Evaluation | | MFR (g/10 min.) | | | 12 | 17 | 12 | 13 | 12 |
| | | Charpy impact strength (kJ/m$^2$) | | | 12 | 11 | 10 | 13 | 11 |
| | | Bending modulus (MPa) | | | 2350 | 2210 | 2420 | 2340 | 2460 |
| | | Vicat softening temperature (° C.) | | | 118 | 124 | 125 | 121 | 128 |
| | | Appearance | | | ○ | ○ | ○ | ○ | ○ |
| | | Crack-observed time (min.) | | | >360 | >360 | >360 | >360 | >360 |
| | | Rupture displacement at weld portion (mm) | | | 7.4 | 7.7 | 7.6 | 7.2 | 7.6 |

TABLE 7

| | | | | | Comparative Example | | | |
|---|---|---|---|---|---|---|---|---|
| | | | | | 5 | 6 | 7 | 8 |
| Thermoplastic resin composition | Formulation (part) | Component [A] | Copolymeric resin | A1-2 | 26.7 | 26.7 | 26.7 | 26.7 |
| | | | Copolymer | A2-1 | 3.9 | 3.9 | 3.9 | 3.9 |
| | | | | A2-2 | 69.4 | 69.4 | 69.4 | 69.4 |
| | | Component [B] | | | | 25 | 5 | 5 |
| | | Component [C] | | | 0.5 | 0.5 | | 6 |
| | | Component [D] | | D-1 | 1 | 1 | 1 | 1 |
| | | Antioxidant | | P-1 | 0.3 | 0.3 | 0.3 | 0.3 |
| | | | | P-2 | 0.1 | 0.1 | 0.1 | 0.1 |
| | | Lubricant | | | 0.5 | 0.5 | 0.5 | 0.5 |
| | Characteristic | Rubbery polymer content (%) | | | 16 | 16 | 16 | 16 |
| | | α-Methylstyrene unit content (%) | | | 50 | 50 | 50 | 50 |
| | | Maleimide compound unit content (%) | | | — | — | — | — |
| | | Total content of α-methylstyrene unit and maleimide compound unit (%) | | | 50 | 50 | 50 | 50 |
| Evaluation | | MFR (g/10 min.) | | | 10 | 8 | 11 | 4 |
| | | Charpy impact strength (kJ/m$^2$) | | | 12 | 18 | 11 | 8 |
| | | Bending modulus (MPa) | | | 2420 | 1960 | 2310 | 2280 |
| | | Vicat softening temperature (° C.) | | | 126 | 109 | 128 | 122 |
| | | Appearance | | | ○ | x | ○ | x |
| | | Crack-observed time (min.) | | | 60 | >360 | 90 | — |
| | | Rupture displacement at weld portion (mm) | | | 5.6 | 4.8 | 5.8 | 3.3 |

The following is clear from Tables 5 to 7.

Comparative Example 5 is an example in which the component [B] was not contained, the time until cracking occurred was short at 60 min., and it is indicated that chemical resistance was poor. Comparative Example 6 is an example in which content of the component [B] was too much and out of the range of the present invention, and peeling in laminae was observed. In addition, Comparative Example 7 is an example in which the component [C] was not contained, the time until cracking occurred was short at 90 min., and it is indicated that chemical resistance was poor. Comparative Example 8 is an example in which content of the component [C] was too much and out of the range of the present invention, and peeling in laminae was observed and appearance was inferior. And pellets were difficult to form using an extruder, being a problem with productivity. In Comparative Example 8, the time until cracking occurred could not be judged due to the roughness of the surface of the molded article.

On the other hand, Examples 15 to 24 exhibited no peeling in laminae, being good appearance. The time until cracking occurred was more than 360 min., and an excellent balance between Charpy impact strength (impact resistance) and Vicat softening temperature (heat resistance) was obtained. Further strength of a weld portion was improved.

It is noted that when compositions in Examples 15 to 24 were subjected to an ordinarily injection molding method not two-points gate type, obtained molded articles (12.7 mm×127 mm×1.6 mm) were not broken by bending test.

INDUSTRIAL APPLICABILITY

The thermoplastic resin composition of the present invention has an excellent balance of chemical resistance, heat resistance and impact resistance and is capable of leading to a better appearance molded article without peeling in laminae and the like. Therefore, it is suitable for a component for a vehicle interior such as instrument panels, console boxes, glove compartments, meter panels, door ornaments, switch panels, center cluster panels, dashboards, door trim, roof trim, rear-side trim, trunk-room trim and handles; an interior component for home electronics appliance such as liners and housing liners; an industrial parts; and the like.

What is claimed is:

1. A thermoplastic resin composition, comprising:
a rubber-reinforced resin;
an ethylene•(meth)acrylic acid ester•carbon monoxide copolymer; and
a polytetrafluoroethylene;
with the proviso that an organic flame retardant, inorganic flame retardant or a reactive flame retardant is not present in the thermoplastic resin composition;
wherein
a content of the ethylene•(meth)acrylic acid ester carbon monoxide copolymer is from 0.5 to 20 parts by weight, and
a content of the polytetrafluoroethylene is in the range from 0.01 to 1 parts by weight,
wherein all parts by weight are with respect to 100 parts by weight of the rubber-reinforced resin,
the rubber-reinforced resin comprises:
a rubber-reinforced copolymeric resin (A1) which is obtained by polymerizing a vinyl-based monomer (b1) in the presence of a rubbery polymer (a), or
a mixture of the rubber-reinforced copolymeric resin (A1) and a copolymer (A2) which is obtained by polymerizing a vinyl-based monomer (b2),
wherein
a content of the rubbery polymer (a) is from 5% to 40% by weight with respect to 100% by weight of the rubber-reinforced resin, and
a total amount of a unit derived from α-methyl styrene and a unit derived from a maleimide-based compound in the rubber-reinforced resin is from 3 to 60% by weight with respect to 100% by weight of said rubber-reinforced resin.

2. The thermoplastic resin composition according to claim 1,
wherein a volume-average particle diameter of the rubbery polymer (a) is from 30 to 2,000 nm.

3. The thermoplastic resin composition according to claim 1,
wherein the rubbery polymer (a) is a diene-based rubbery polymer and a volume-average particle diameter of the diene-based rubbery polymer is from 100 to 800 nm.

4. The thermoplastic resin composition according to claim 1,
wherein the rubbery polymer (a) is a non-diene-based rubbery polymer and a volume-average particle diameter of the non-diene-based rubbery polymer is from 50 to 150 nm.

5. The thermoplastic resin composition according to claim 3,
wherein
the rubbery polymer consists of (a) a rubbery polymer (a') having a volume-average particle diameter from 100 to 800 nm and a rubbery polymer (a") having a volume-average particle diameter from 50 to 150 nm, and
a content of the rubbery polymer (a') is from 10% to 70% by weight and
a content of the rubbery polymer (a") is from 30% to 90% by weight with respect to 100% by weight of the total of the rubbery polymer (a') and the rubbery polymer (a").

6. The thermoplastic resin composition according to claim 5,
wherein the rubbery polymer (a') is a diene-based rubbery polymer and the rubbery polymer (a") is a non-diene-based rubbery polymer.

7. The thermoplastic resin composition according to claim 6,
wherein the thermoplastic resin composition further comprises a modified polyolefin resin, and
a content of the modified polyolefin resin is from 0.05 to 15 parts by weight with respect to 100 parts by weight of the rubber-reinforced resin.

8. The thermoplastic resin composition according to claim 1,
wherein when stress is applied to a plate-shaped molded article of the thermoplastic resin composition coated with dioctyl phthalate to a degree of 2% bending strain, a time until cracking occurs is 60 minutes or more.

9. The thermoplastic resin composition according to claim 1,
further comprising a modified polyolefin resin,
wherein a content of the modified polyolefin resin is from 0.05 to 15 parts by weight with respect to 100 parts by weight of the rubber-reinforced resin.

10. The thermoplastic resin composition according to claim 9,
wherein the modified polyolefin resin comprises an olefin-based resin having a functional group selected from the group consisting of a carboxyl group, an acid anhydride group, an epoxy group, a hydroxyl group and a cyano group.

11. The thermoplastic resin composition according to claim 9,
wherein the modified polyolefin resin is a graft copolymer obtained by polymerizing monomers consisting of an aromatic vinyl compound and a cyanidated vinyl compound in the presence of an olefin-based resin having an epoxy group.

12. The thermoplastic resin composition according to claim 9,
wherein when stress is applied to a plate-shaped molded article of the thermoplastic resin composition coated with dioctyl phthalate to a degree of 2% bending strain, a time until cracking occurs is 60 minutes or more.

13. A molded article comprising the thermoplastic resin composition according to claim 1.

14. A vehicle component, comprising the molded article according to claim 13.

15. A molded article comprising the thermoplastic resin composition according to claim 9.

16. A vehicle component, comprising the molded article according to claim 15.

* * * * *